(12) United States Patent
Meier

(10) Patent No.: US 10,968,773 B1
(45) Date of Patent: *Apr. 6, 2021

(54) TURBINE ASSEMBLY INCLUDING AT LEAST ONE SUPERHARD BEARING

(71) Applicant: US SYNTHETIC CORPORATION, Orem, UT (US)

(72) Inventor: Jarrett Meier, Orem, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/527,303

(22) Filed: Jul. 31, 2019

Related U.S. Application Data

(63) Continuation of application No. 15/877,212, filed on Jan. 22, 2018, now Pat. No. 10,408,086, which is a continuation of application No. 14/201,220, filed on Mar. 7, 2014, now Pat. No. 9,909,450.

(60) Provisional application No. 61/780,405, filed on Mar. 13, 2013.

(51) Int. Cl.
  *F01D 25/16* (2006.01)

(52) U.S. Cl.
  CPC .................... *F01D 25/16* (2013.01)

(58) Field of Classification Search
  CPC .. F01D 25/16; F04D 29/0513; F04D 29/0563; F04D 29/059; F04D 29/054; F05D 2220/40; F05D 2240/52
  See application file for complete search history.

(56) References Cited

U.S. PATENT DOCUMENTS

| | | |
|---|---|---|
| 3,102,490 A | 9/1963 | Shiley |
| 3,874,824 A | 4/1975 | Cronstedt et al. |
| 4,895,458 A | 1/1990 | Gerster |
| 7,025,579 B2 | 4/2006 | Woollenweber et al. |
| 7,516,804 B2 | 4/2009 | Vail |
| 7,635,035 B1 | 12/2009 | Bertagnolli et al. |
| 7,866,418 B2 | 1/2011 | Bertagnolli et al. |
| 7,998,573 B2 | 8/2011 | Qian et al. |
| 8,236,074 B1 | 8/2012 | Bertagnolli et al. |
| 8,297,382 B2 | 10/2012 | Bertagnolli et al. |
| 9,909,450 B1 * | 3/2018 | Meier .................. F01D 25/166 |
| 10,408,086 B1 * | 9/2019 | Meier ..................... F01D 25/16 |
| 2003/0223892 A1 | 12/2003 | Woollenweber et al. |
| 2004/0200215 A1 | 10/2004 | Woollenweber et al. |
| 2009/0148093 A1 | 6/2009 | Fahrni, Jr. et al. |
| 2010/0310366 A1 | 12/2010 | Eguchi et al. |

(Continued)

OTHER PUBLICATIONS

Advisory Action for U.S. Appl. No. 15/877,212 dated Mar. 28, 2019.

(Continued)

*Primary Examiner* — Reinaldo Sanchez-Medina
(74) *Attorney, Agent, or Firm* — Dorsey & Whitney LLP

(57) ABSTRACT

Bearing members, such as journal bearings, and turbine assemblies for use in high speed, high horsepower applications (e.g., turbochargers, jet engines, internal combustion engines, blowers, steam turbines, compressors, and pumps) including a rotatable shaft, a compressor wheel coupled to the shaft (e.g., at one end), a turbine wheel spaced from the compressor wheel, the turbine wheel also being coupled to the shaft (e.g., at another end), and at least one bearing member having a superhard bearing surface.

22 Claims, 13 Drawing Sheets

(56) References Cited

U.S. PATENT DOCUMENTS

| | | | |
|---|---|---|---|
| 2011/0056213 | A1 | 3/2011 | Somanath et al. |
| 2012/0171033 | A1 | 7/2012 | Okoroafor |
| 2012/0219245 | A1 | 8/2012 | McKeirnan et al. |
| 2012/0237152 | A1 | 9/2012 | Wheals |
| 2012/0269624 | A1 | 10/2012 | Boening et al. |
| 2013/0170777 | A1 | 7/2013 | Ito et al. |
| 2013/0217535 | A1 | 8/2013 | Suzuki et al. |
| 2014/0119898 | A1 | 5/2014 | Nishida et al. |
| 2014/0270614 | A1 | 9/2014 | McKeirnan et al. |
| 2015/0017000 | A1 | 1/2015 | Sato et al. |
| 2015/0030453 | A1 | 1/2015 | Zang |
| 2015/0152915 | A1 | 6/2015 | Peterson |

OTHER PUBLICATIONS

Advisory Action for U.S. Appl. No. 15/877,212 dated Mar. 4, 2019.
Final Office Action for U.S. Appl. No. 14/201,220 dated Jun. 13, 2017.
Final Office Action for U.S. Appl. No. 15/877,212 dated Nov. 20, 2018.
Issue Notification for U.S. Appl. No. 14/201,220 dated Feb. 14, 2018.
Nature, Materials: Ultrahard polycrystalline diamond from graphite, Sep. 23, 2009 http:www.nature.com/nature/journal/v421/n6923/full421599b.html.
Non-Final Office Action for U.S. Appl. No. 14/201,220 dated Nov. 17, 2016.
Non-Final Office Action for U.S. Appl. No. 15/877,212 dated May 15, 2018.
Notice of Allowance for U.S. Appl. No. 14/201,220 dated Oct. 25, 2017.
Notice of Allowance for U.S. Appl. No. 15/877,212 dated May 9, 2019.
Restriction Requirement for U.S. Appl. No. 14/201,220 dated Jun. 14, 2016.
U.S. Appl. No. 12/184,457, filed Aug. 4, 2008.
U.S. Appl. No. 13/070,636, filed Mar. 24, 2011.
U.S. Appl. No. 61/780,405, filed Mar. 13, 2013.
Issue Notification for U.S. Appl. No. 15/877,212 dated Aug. 21, 2019.

\* cited by examiner

TURBINE ASSEMBLY INCLUDING AT LEAST ONE SUPERHARD BEARING

CROSS-REFERENCE TO RELATED APPLICATIONS

This application is a continuation of U.S. application Ser. No. 15/877,212 filed 22 Jan. 2018, which is a continuation of U.S. application Ser. No. 14/201,220 filed on 7 Mar. 2014, which claims priority to U.S. Provisional Application No. 61/780,405 filed on 13 Mar. 2013, the disclosure of each of which is incorporated herein, in its entirety, by this reference.

BACKGROUND

Journal and thrust-bearing assemblies are employed in a variety of high speed and/or high horsepower applications, such as turbochargers, jet engines, internal combustion engines, etc.

Despite the availability of a number of different bearing apparatuses for such applications, manufacturers and users continue to seek bearing apparatuses that exhibit improved performance characteristics.

SUMMARY

Embodiments of the invention relate to turbine assemblies for use in one or more of high horsepower, high speed, or high load engine applications that include at least one superhard bearing, such as one or more superhard journal and/or thrust-bearing assemblies. Examples of such engine applications include, but are not limited to turbochargers, jet engines, internal combustion engines, blowers, steam turbines, compressors, and pumps.

According to an embodiment, a turbine assembly includes a rotatable shaft, a compressor wheel coupled to the shaft (e.g., at one end), and a turbine wheel spaced from the compressor wheel and coupled to the shaft (e.g., at another end). The assembly further includes at least one bearing member (e.g., at least one thrust-bearing member or at least one radial bearing assembly). In an embodiment, the turbine assembly includes at least one thrust-bearing member. In an embodiment, the turbine assembly includes at least one radial bearing member. In another embodiment, the turbine assembly includes at least one thrust-bearing member and at least one radial bearing assembly.

In another embodiment, the turbine assembly includes two thrust-bearing members and/or two radial bearing assemblies. In another embodiment, the turbine assembly includes two thrust-bearing members and two radial bearing assemblies. The first thrust-bearing member and first radial bearing assembly may be associated with the compression wheel, while the second thrust-bearing and second radial bearing assembly may be associated with the turbine wheel. For example, the first thrust-bearing member may be disposed about the shaft (e.g., adjacent to the compressor wheel), while the second thrust-bearing member is similarly disposed about the shaft (e.g., adjacent to the turbine wheel). Each thrust-bearing member includes a superhard thrust-bearing surface (e.g., polycrystalline diamond). Each radial bearing assembly is also disposed about the shaft adjacent to a respective one of the thrust-bearing members. For example, the first and second thrust-bearing members may be disposed inwardly on the shaft, between the two wheels, with the radial bearing assemblies disposed between the thrust-bearing members. Each radial bearing assembly includes a radial bearing stator and radial bearing rotor. The rotor is coupled to the shaft, and includes a radial superhard bearing surface oriented generally opposed to the radial superhard bearing surface of the stator. The radial bearing stators may further include a thrust-bearing surface (e.g., a generally planar surface) oriented generally opposed to the thrust-bearing surface of the corresponding thrust-bearing member. In other words, the stators may include both radial and planar bearing surfaces.

Because the bearing surfaces of the thrust-bearing members and radial bearing members include a superhard material, the bearing surfaces may provide substantially increased wear resistance as compared to conventional materials. In an embodiment, the bearing surfaces include polycrystalline diamond that may provide excellent wear resistance. Such configurations may also provide very high thermal conductivity to quickly draw heat away from the bearing surfaces to a lubricating fluid (e.g., oil) that may be disposed about the bearing surfaces.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION

Figure 1:
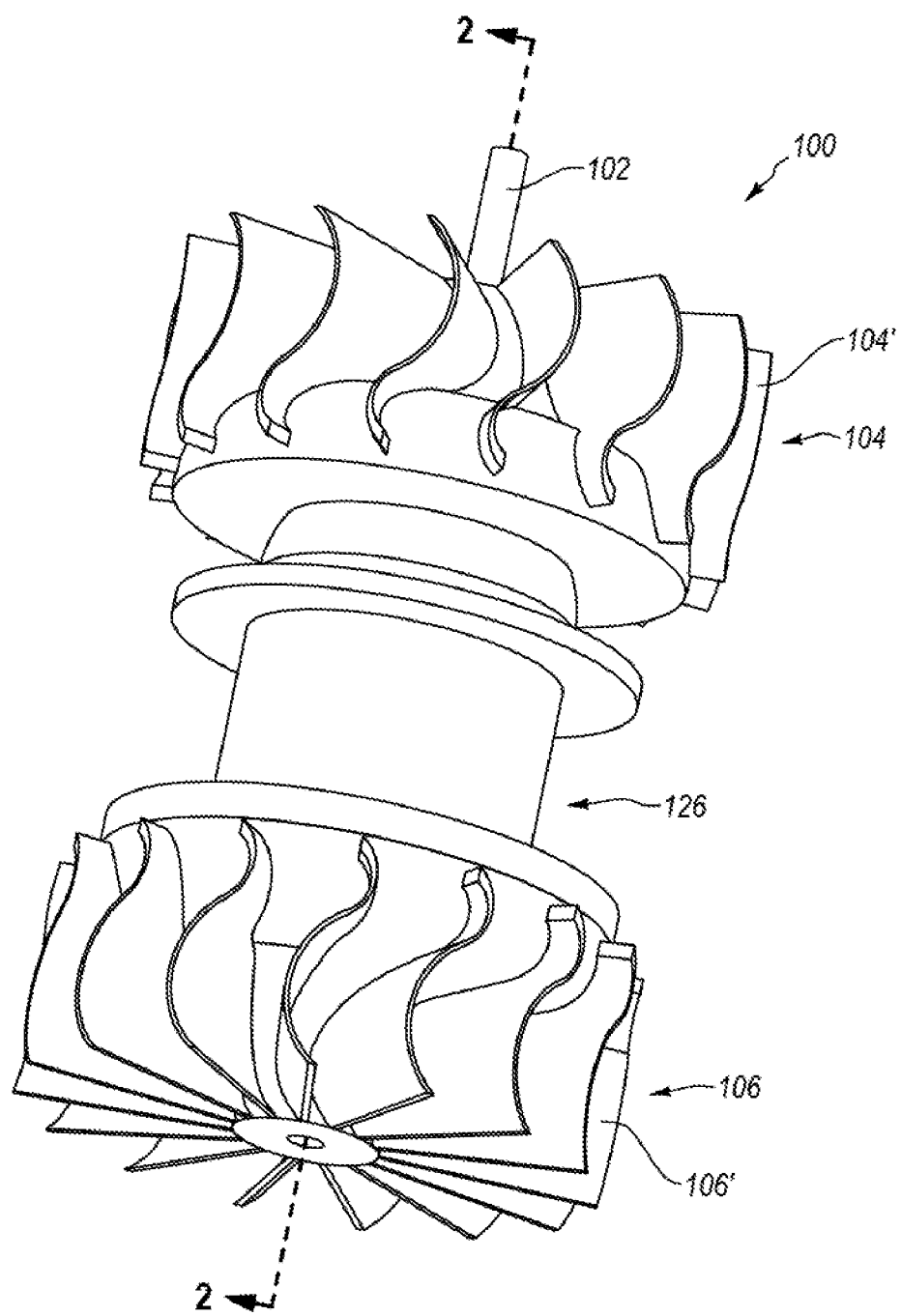
FIG. 1 is an isometric view of an embodiment of a turbine assembly according to an embodiment.

Embodiments of the invention relate to turbine assemblies including at least one superhard bearing for use in forced induction high speed engines such as turbochargers, jet engines, internal combustion engines, blowers, steam turbines, compressors, and pumps. For example, such turbine assemblies may include one or more superhard journal and thrust-bearing assemblies. The bearing surfaces within such assemblies may include a superhard material, such as polycrystalline diamond, which may provide increased wear resistance as well as may provide improved thermal management characteristics. For example, thermal management characteristics may be particularly improved where the bearing surfaces include diamond, which has a relatively high thermal conductivity.

The bearing surfaces may be in the form of polycrystalline diamond ("PCD"), which may be attached to a substrate to form a polycrystalline diamond compact ("PDC"). For example, in any of the embodiments disclosed herein the bearing surfaces that employ PCD and/or a PDC may be formed and/or structured as disclosed in U.S. Pat. Nos. 7,516,804; 7,866,418; 8,236,074; and 8,297,382; which are incorporated herein, in their entirety, by this reference. Furthermore, in any of the bearing surfaces that use PCD, a catalyst used to form the PCD (e.g., cobalt) may be leached to a selected depth from the bearing surface. In an embodiment, other forms of diamond may also be employed, such as natural diamond, other synthetic diamond, a diamond-silicon carbide composite as disclosed in U.S. Pat. No. 7,998,573 that is incorporated herein in its entirety by this reference, diamond deposited by chemical vapor deposition, diamond or diamond-like carbon (e.g., amorphous carbon) deposited by physical vapor deposition, or other deposition technique.

PCD includes a plurality of directly bonded-together diamond grains exhibiting diamond-to-diamond therebetween (e.g., $sp^3$ bonding) and defining a plurality of interstitial regions therebetween. Typical PCD elements may be formed in a high-pressure/high-temperature ("HPHT") process in which a volume of diamond particles is placed with a metal-solvent catalyst (e.g., typically cobalt, nickel, iron, or combinations thereof) into a container or cartridge. The metal-solvent catalyst may be provided in the form of a metal-solvent catalyst-cemented carbide (e.g., cobalt cemented tungsten carbide) substrate to which a PCD element is to be bonded. When a substrate is employed, the substrate and volume of diamond particles are processed under HPHT conditions in the presence of the metal-solvent catalyst that causes the diamond particles to bond to one another to form a matrix of bonded diamond grains defining a PCD element.

The cobalt or other metal-solvent catalyst (e.g., present as a cementing constituent in the substrate) liquefies and sweeps from a region adjacent to the volume of diamond particles into interstitial regions between the diamond particles during the HPHT process. The metal-solvent catalyst acts to promote intergrowth between the diamond particles, which results in the formation of a matrix of bonded diamond grains having diamond-to-diamond bonding therebetween, with interstitial regions between the bonded diamond grains being occupied by the metal-solvent catalyst.

Once the PCD element is formed, the metal-solvent catalyst may be leached from at least a portion of the PCD element through exposure to a suitable acid. Even after leaching, there may remain some fraction of residual metal-solvent catalyst within interstitial regions of the PCD element. Unleached PCD may also be employed.

Non-metallic catalysts can also be used in the formation of a PCD element. For example carbonate materials, particularly alkali metal and/or alkaline earth metal carbonates, may be used to catalyze the desired intergrowth between diamond particles. U.S. patent application Ser. No. 12/185,457; U.S. patent application Ser. No. 13/070,636; and U.S. Pat. No. 7,635,035 disclose sintered PCD elements fabricated using carbonates that may be employed in any of the embodiments disclosed herein. U.S. patent application Ser. No. 12/185,457; U.S. patent application Ser. No. 13/070,636; and U.S. Pat. No. 7,635,035 are incorporated herein, in their entirety, by this reference. In such a case, the PCD element may include a non-metallic catalyst and/or at least one derivative thereof disposed within at least some of the interstitial regions of the PCD element. Most or substantially all of any non-metallic catalyst and/or at least one derivative thereof may be subsequently removed through leaching or another suitable process.

In addition to carbonate catalysts, other non-metallic catalysts include hydroxide catalysts (e.g., alkali metal and/or alkaline earth metal hydroxides). One such suitable hydroxide may include magnesium hydroxide. Other non-metallic catalysts that may be suitable for use include phosphorus, sulfur, or combinations thereof. Another contemplated non-traditional catalyst that may be suitable for use is copper or copper alloys.

While diamond, particularly PCD may be particularly preferred, other superhard materials may also be employed for the bearing surfaces. As used herein, a superhard material employed for the bearing surface is a material exhibiting a hardness that is at least as hard as tungsten carbide. Examples of superhard materials include, but are not limited to, polycrystalline cubic boron nitride, silicon carbide, tungsten carbide, tantalum carbide, other carbides exhibiting a hardness at least equal to that of tungsten carbide, diamond, or any combination of the foregoing. Types of diamond include, but are not limited to, natural diamond, polycrystalline diamond, a diamond-silicon carbide composite, diamond deposited by chemical vapor deposition, diamond or diamond-like carbon (e.g., amorphous carbon) deposited by physical vapor deposition, or other deposition technique, or other synthetic diamond.

FIGS. 1-3A show an isometric view, a cross-sectional view, and an exploded isometric view, respectively, of an embodiment of a turbine assembly 100, which may employ diamond or other superhard bearing surfaces therein. Assembly 100 may include a rotatable shaft 102, a compressor wheel 104, and a turbine wheel 106. Compressor wheel 104 and turbine wheel 106 may each include a plurality of blades 104' and 106'. Although shown with one compressor wheel 104 and one turbine wheel 106, it will be understood that in an embodiment, multiple compressor and/or turbine wheels may be provided.

Figure 2:
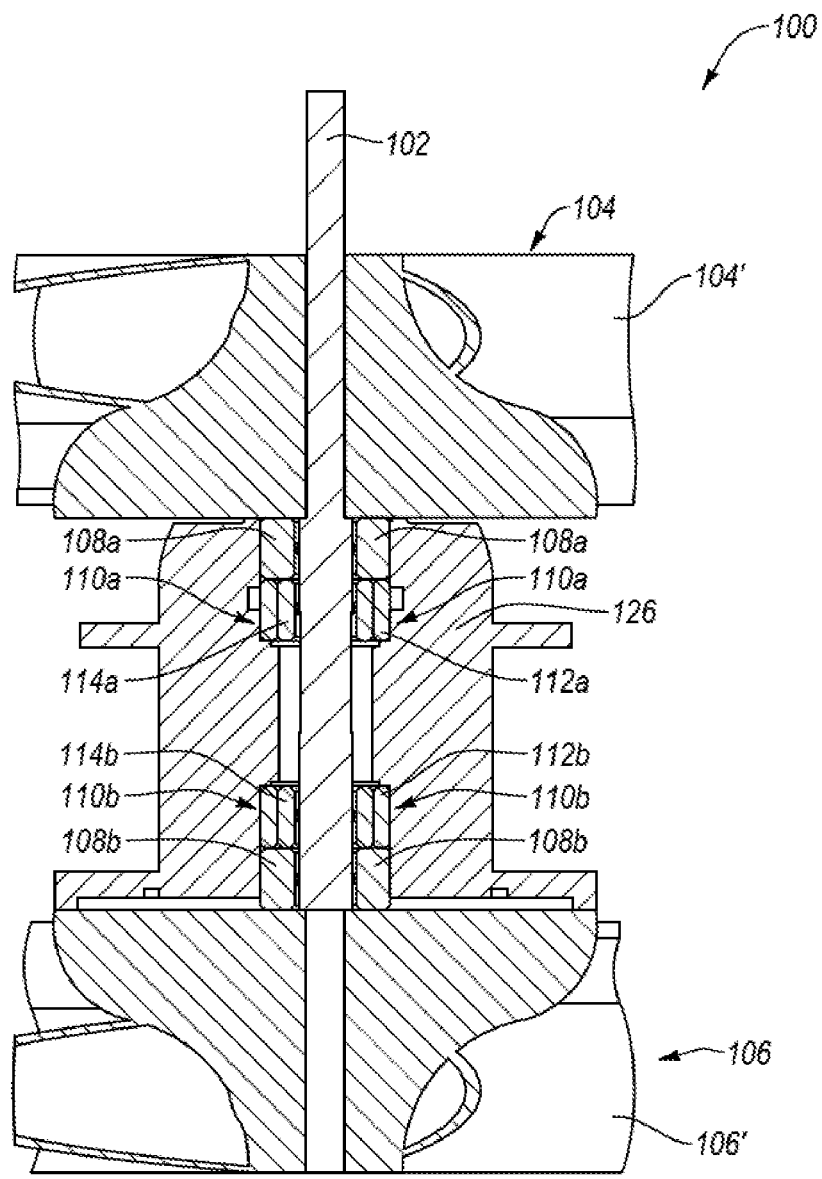
FIG. 2 is a cross-sectional view of the assembly of FIG. 1 taken along line 2-2 thereof.
Figure 3A:
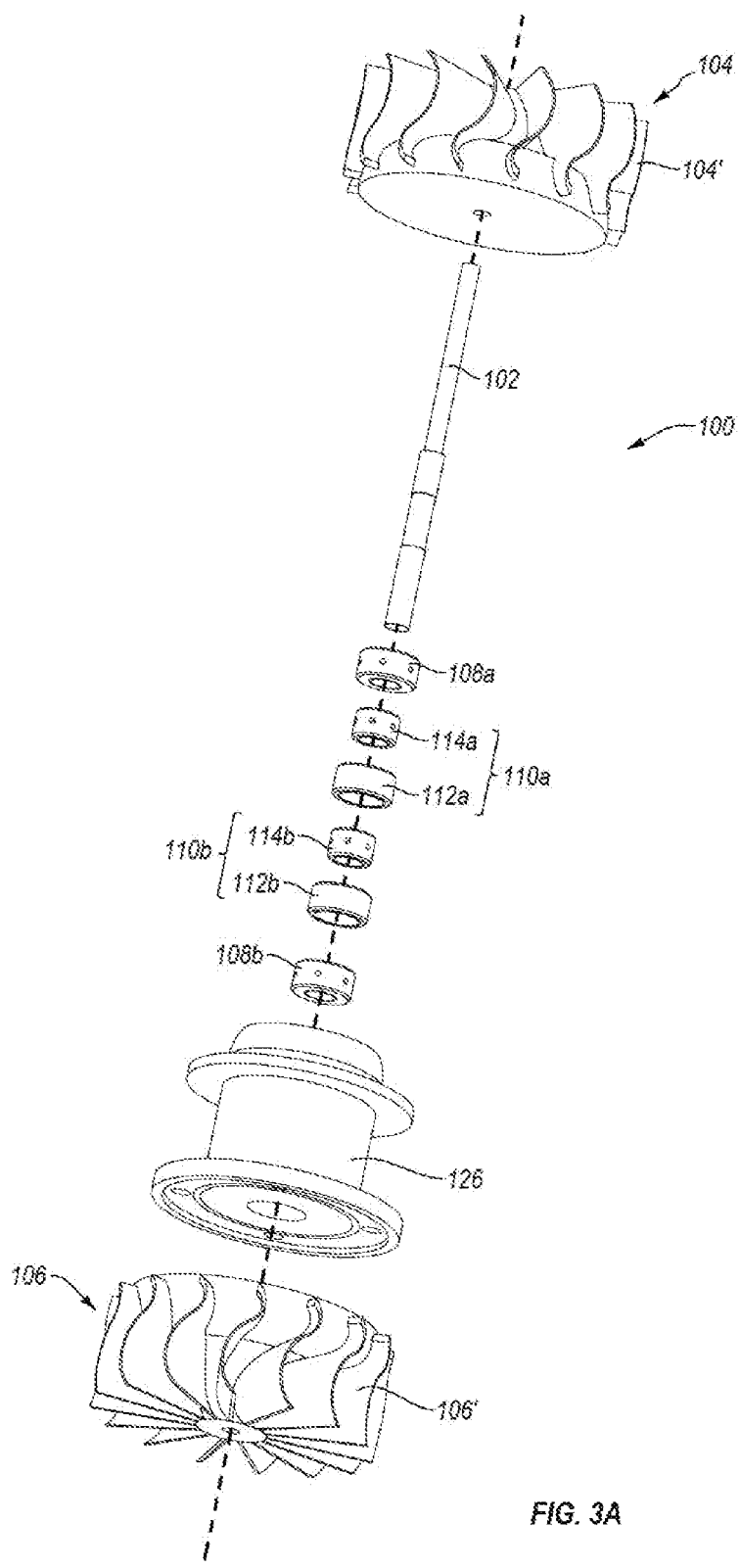
FIG. 3A is an exploded isometric view of the assembly of FIG. 1.
Figure 3B:
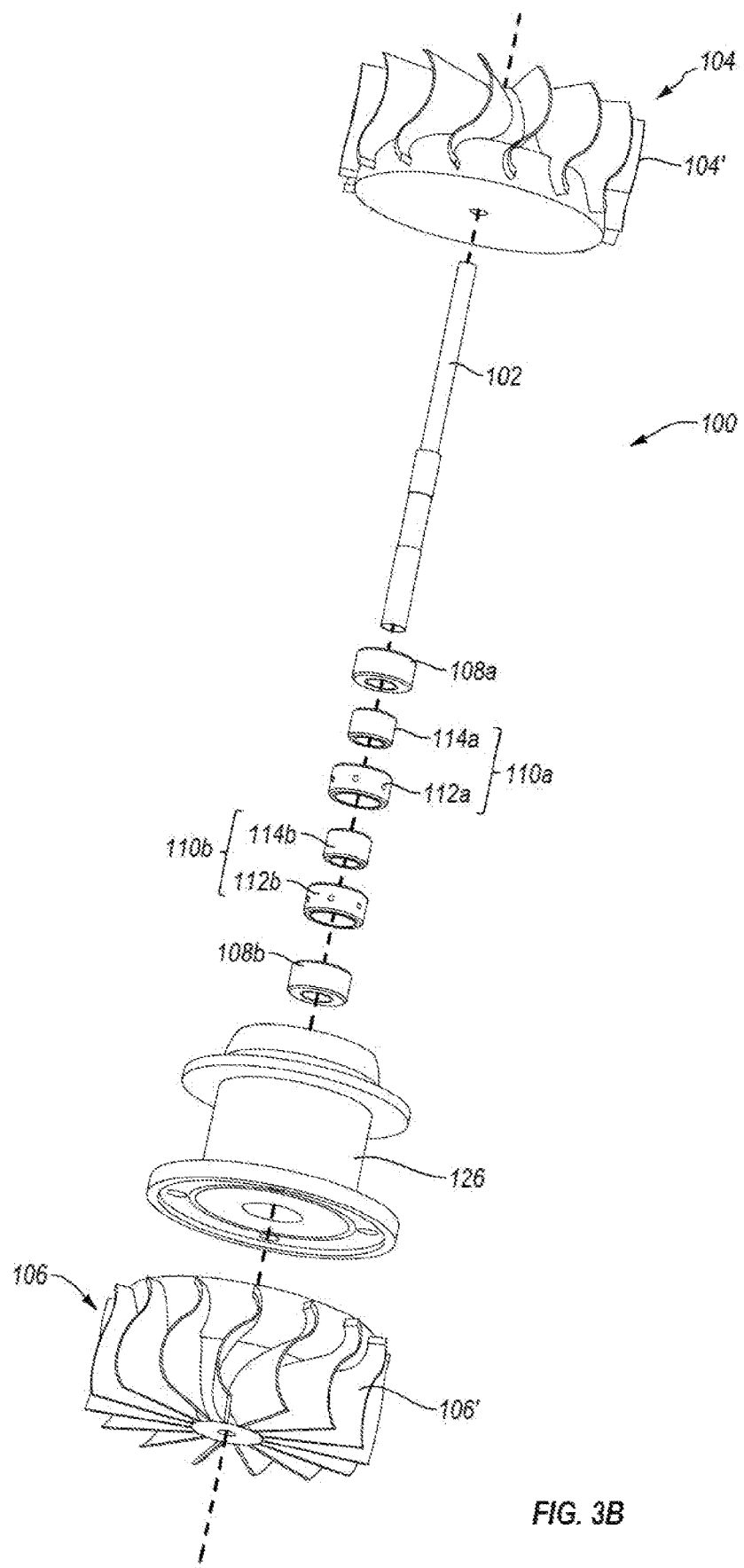
FIG. 3B is an exploded isometric view of another assembly according to another embodiment.
Figure 4A:
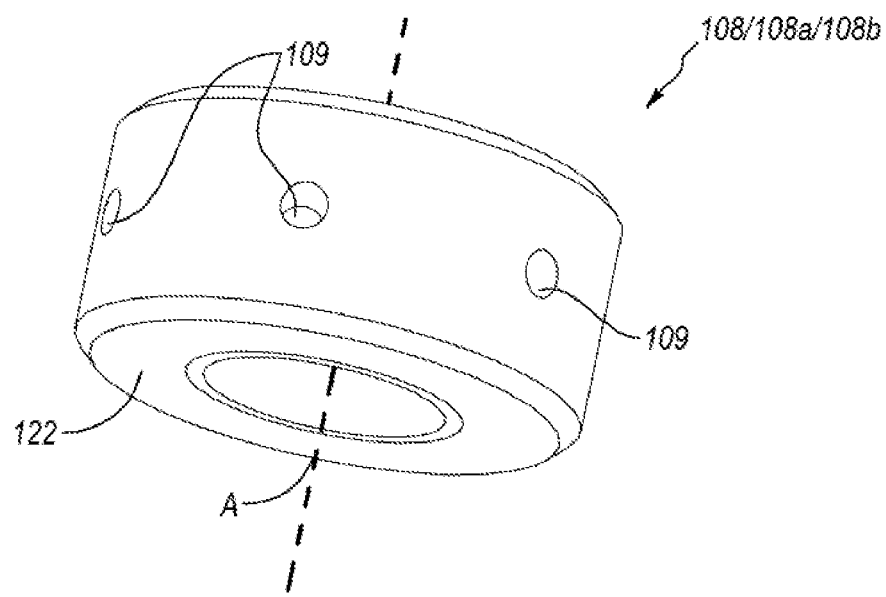
FIG. 4A is a close-up isometric view of a thrust-bearing member of the assembly of FIG. 1.
Figure 4B:
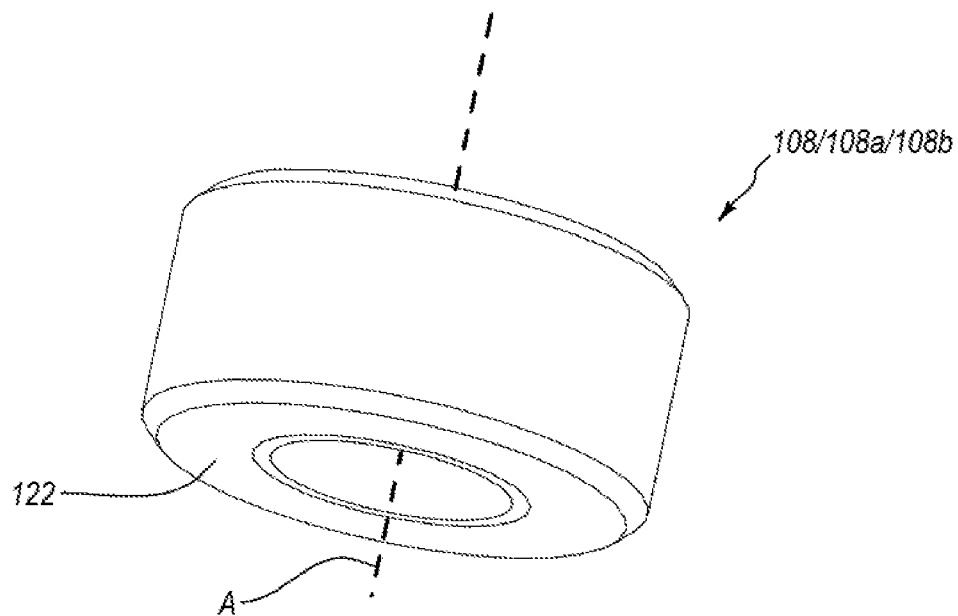
FIG. 4B is a close-up isometric view of another embodiment of a thrust-bearing member.

As shown in FIGS. 2 and 3A, first and second thrust-bearing members 108a and 108b are disposed about shaft 102. First thrust-bearing member 108a may be disposed adjacent to compressor wheel 104, between compressor wheel 104 and first radial bearing assembly 110a, while second thrust-bearing member 108b may be disposed adjacent to turbine wheel 106, between turbine wheel 106 and second radial bearing assembly 110b. FIG. 3A shows an embodiment in which holes or lubricant supply channels are provided transversely through thrust-bearing members 108a, 108b, inner radial race 114a, and inner radial race 114b. FIG. 3B shows another embodiment, but in which the holes or lubricant supply channels are provided through radial outer race 112a and 112b. FIGS. 4A and 4B show close-up isometric views of a thrust-bearing member 108, as first and second thrust-bearing members 108a and 108b may be similarly configured.

Figure 5B:
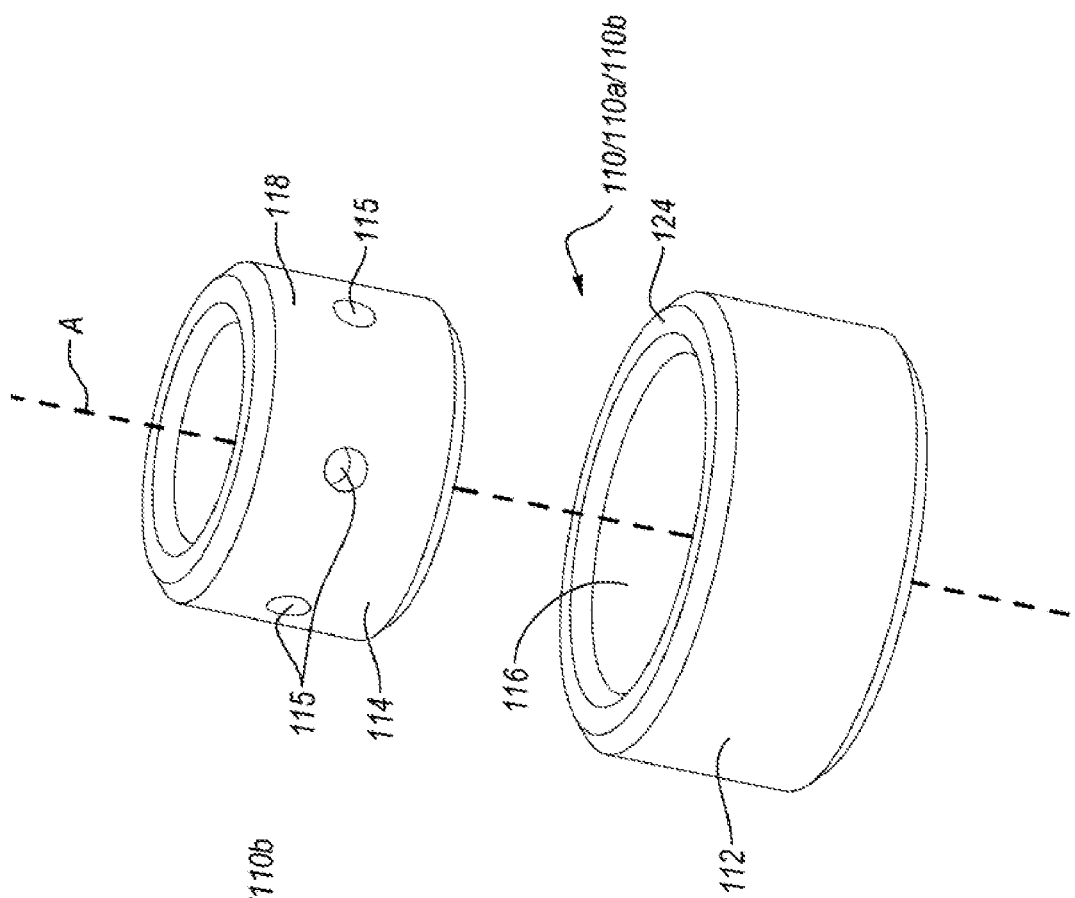
FIG. 5B is a close-up, exploded, isometric view of the radial bearing assembly of FIG. 5A, but from a different angle.
Figure 5A:
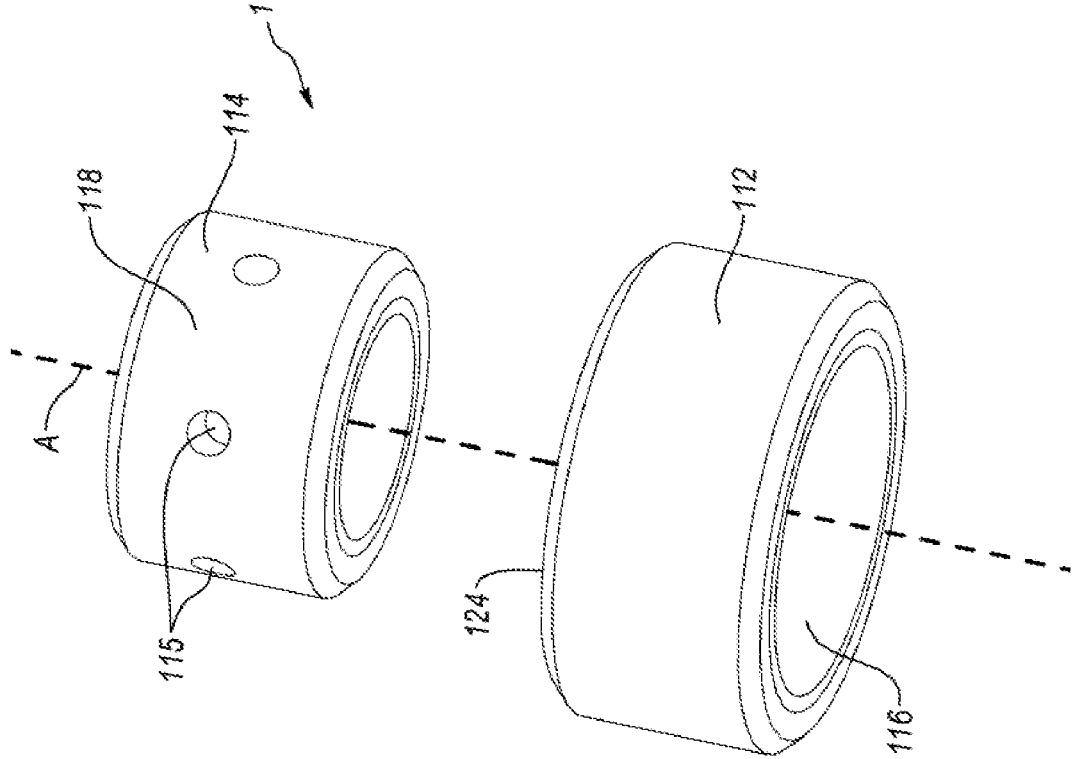
FIG. 5A is a close-up, exploded, isometric view of a radial bearing assembly of the assembly of FIG. 1.

In addition to thrust-bearing member 108a and 108b disposed about shaft 102, assembly 100 may further include first and second radial bearing assemblies 110a and 110b disposed about shaft 102. For example, in the illustrated embodiment, compressor and turbine wheels 104, 106 are disposed adjacent to opposite ends of shaft 102, with respective thrust-bearing members 108a and 108b disposed adjacent to each corresponding wheel. Respective radial bearing assemblies 110a and 110b are shown disposed between the thrust-bearing members 108a, 108b, with each radial bearing assembly disposed adjacent to a corresponding thrust-bearing member. FIGS. 5A and 5B show close-up views of a radial bearing assembly 110, as first and second radial bearing assemblies 110a, 110b may be differently, similarly, or identically configured.

Each radial bearing assembly 110, 110a, 110b may include an outer radial bearing member (e.g., a stator), also referred to as an outer race 112, 112a or 112b, and an inner radial bearing member (e.g., a rotor) that is also referred to as an inner race 114, 114a, or 114b. As radial bearing assemblies 110a and 110b may be similarly configured, reference will be made to radial bearing assembly 110 of FIGS. 5A and 5B. Both outer race 112 and inner race 114 include radial bearing surfaces that are oriented to be generally opposed to one another. For example, as shown in FIGS. 5A and 5B, where outer race 112 is shaped generally as a hollow cylinder, the inside diameter of outer race 112 may provide or at least support a radial bearing surface 116. Similarly, where inner race 114 is shaped generally as a hollow cylinder, the outside diameter of inner race 114 may provide or at least support a radial bearing surface 118.

Figure 6:
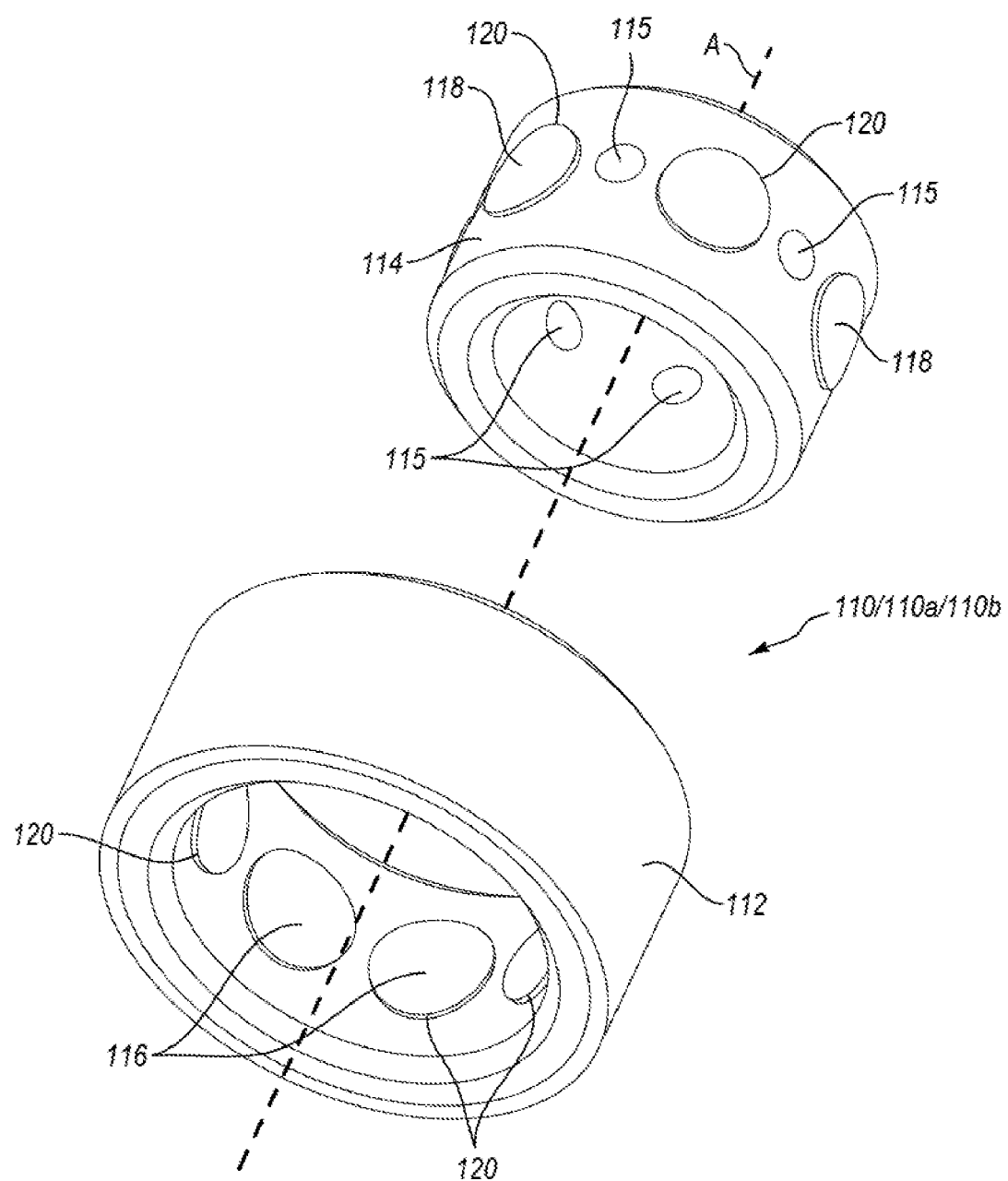
FIG. 6 is a close-up, exploded, isometric view of a radial bearing assembly according to another embodiment.

In an embodiment, the radial bearing members or races 112, 114 themselves may be formed of a superhard material, such as polycrystalline diamond, so that the entire inside diameter 116 of outer race 112 and the entire outside diameter 118 of inner race 114 may provide the radial bearing surfaces. As shown in FIG. 6, in another embodiment, one or more bearing elements (e.g., PDCs) 120 including bearing surfaces 116 and 118 may be mounted on outer race 112 and inner race 114. For such a configuration, bearing surfaces 118 of elements 120 mounted to inner race 114 may be convexly curved to mate with the concave curvature of bearing surfaces 116 of elements 120 of outer race 112. The inner race 114 is positioned generally within the outer race 112 and, thus, the inner race 114 and outer race 112 may be configured so that the bearing surfaces 118 and 116 may at least partially contact one another and move relative to each other as the inner race 114 and outer race 112 rotate relative to each other during use.

Figure 5C:
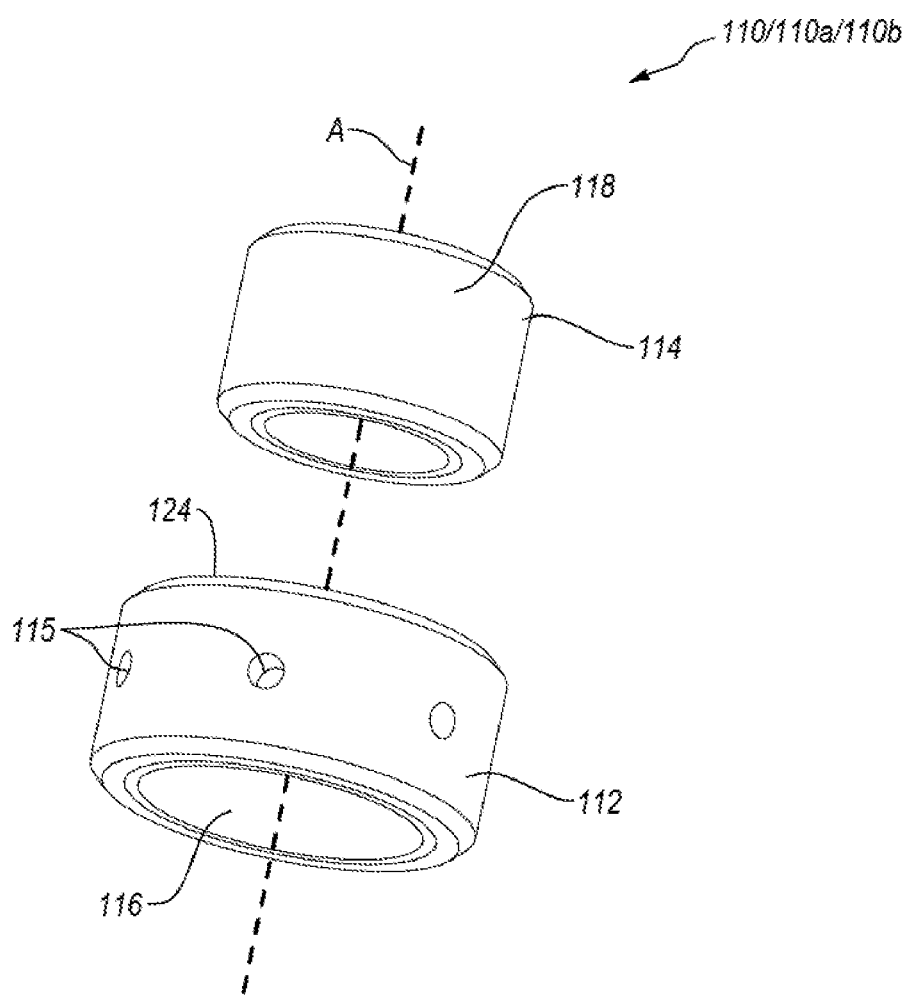
FIG. 5C is a close-up, exploded, isometric view of another embodiment of a radial bearing assembly.

As shown in FIG. 4A, thrust-bearing member 108 may be shaped generally as a hollow cylinder, and may include one or more lubricant supply channels 109 formed therethrough, generally transverse to a longitudinal axis A generally corresponding to shaft 102. Similarly, inner race 114 may include one or more lubricant supply channels 115 formed therethrough, generally transverse to longitudinal axis A. During operation, channels 115 and 109 may allow oil or other lubricating fluid to be delivered to the bearing surfaces. In other embodiments, one or more bearing elements in the turbine assembly may be operated without liquid lubricant (e.g., dry lubricated and/or air-cooled). Examples of dry lubricants include, but are not limited to graphite, fluoropolymers (e.g., Teflon), molybdenum disulfide, hexagonal boron nitride, tungsten disulfide, and combinations thereof. In an embodiment, as described above in conjunction with FIG. 3B, thrust-bearing member 108 and inner race 114 may not include channels 109 and 115, respectively, and similar channels may be provided within outer race 112. Such a configuration is shown in FIGS. 4B and 5C.

Where both inner race 114 and thrust-bearing member 108 are attached to shaft 102 via brazing, press-fitting, or another suitable technique and rotate with shaft 102, an inner planar surface 122 of thrust-bearing member 108 may be generally oriented opposed to and in bearing contact with a corresponding outwardly oriented planar surface 124 of outer race 112. Thus, outer race 112 may include both a radial bearing surface 116 (e.g., corresponding to the inside diameter of outer race 112) and a planar bearing surface 124 oriented to bear against corresponding planar bearing surface 122 of thrust-bearing member 108.

A bearing housing 126 may also be provided for housing thrust-bearing members 108a, 108b, as well as radial bearing assemblies 110a and 110b. Bearing housing 126 may include one or more lubricant supply channels disposed therethrough for supplying lubricant to the radial bearing assemblies, the thrust-bearing assemblies, or both.

By way of example, any of various PDCs or PCD tables may be employed as bearing members 108 112, or 114. For example, thrust-bearing member 108 may include a generally cylindrical PCD table or PDC through which a longitudinal hole has been formed (e.g., by electro-discharge machining, laser cutting, grinding, lapping, other method, or combinations thereof to achieve the desired geometry). Inner and outer races 114 and 112 may similarly include PCD elements or PDCs which have been shaped into a generally hollow cylinder. Alternatively, any of the bearing members 108, 112, or 114 may include an annular support ring body that may be fabricated from any suitable material, such as carbon steel, stainless steel, etc. over which a superhard material has been attached to provide the desired bearing surfaces. In another embodiment, one or more PDCs or PCD tables or other bodies may be mounted onto an annular support ring (e.g., as shown in FIG. 6) so that the bearing surface is provided by one or more PDCs or PCD bodies mounted on the support ring.

Outer races 112, 112a or 112b (or any stator) may be configured to prevent rotation of the stator. For example, the outer race or other stator may be press-fit, keyed, may include a set screw, may be pinned, etc. relative to, for example, bearing housing 126 to prevent rotation.

Diamond has substantially higher thermal conductivity than many other superhard materials, such as silicon carbide and other carbides. Where one or more of bearing surfaces 122, 124, 118, and 116 includes diamond, heat generated during operation may be better dissipated as compared to other superhard materials. Diamond provides substantially higher thermal conductivity than even conventional metal bearing materials typically employed in such journal bearing assemblies. Thus, a bearing assembly including superhard bearing surfaces, particularly diamond, may provide increased wear resistance as well as better thermal management characteristics.

Figure 7:
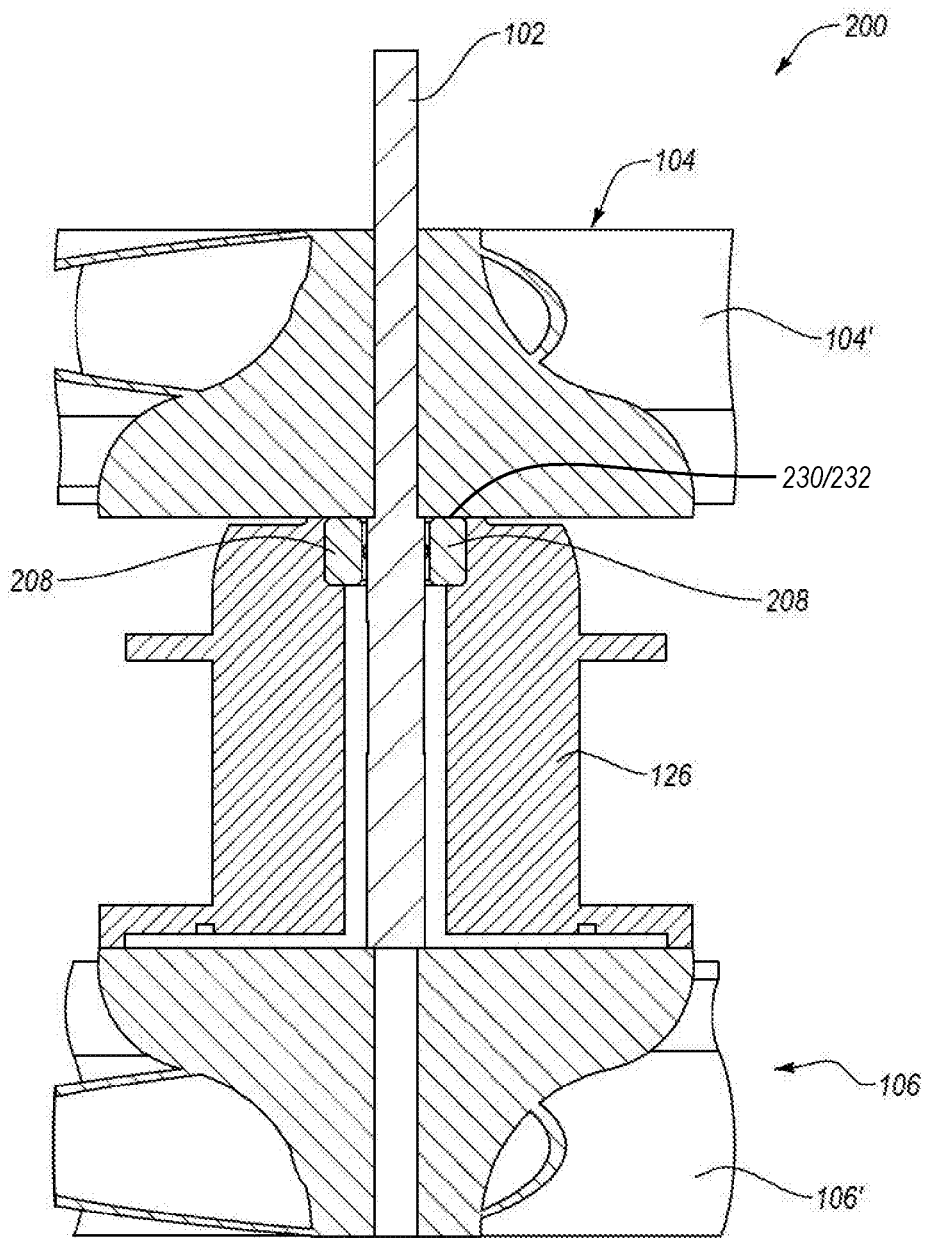
FIG. 7 is a cross-sectional view of another embodiment of a turbine assembly including a thrust-bearing member.

FIGS. 7-11 show cross-sectional views of additional, generally simplified embodiments of other turbine assemblies. For example, FIG. 7 shows a turbine assembly 200, including a rotatable shaft 102, a compressor wheel 104, and a turbine wheel 106. Compressor wheel 104 and turbine wheel 106 may each include a plurality of blades 104' and 106'. A thrust-bearing member 208 is disposed about shaft 102 and includes a thrust-bearing stator surface 230. The thrust-bearing stator surface 230 bears against an opposing surface 232 of compressor wheel 104 and an opposing surface of bearing housing. Such a configuration including a single superhard thrust-bearing member may be beneficial where wear is limited to a particular component (e.g., compressor wheel 104). While shown disposed adjacent to compressor wheel 104, in other embodiments, it will be understood that thrust-bearing member 208 may be disposed adjacent to turbine wheel 106 or anywhere therebetween, as desired.

Figure 8:
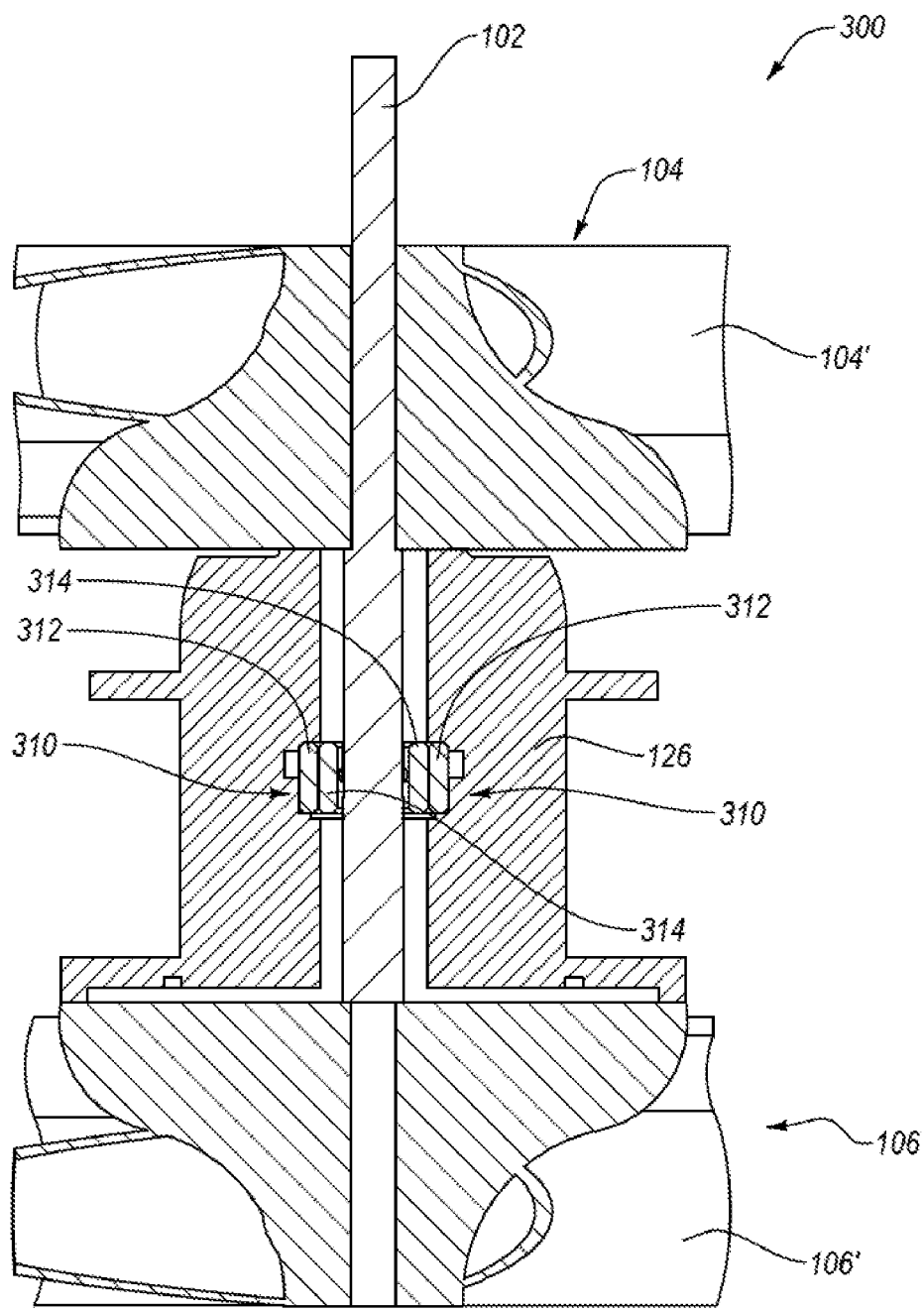
FIG. 8 is a cross-sectional view of another embodiment of a turbine assembly including radial bearing members.

FIG. 8 shows another turbine assembly 300 including a rotatable shaft 102, a compressor wheel 104, and a turbine wheel 106. Compressor wheel 104 and turbine wheel 106 may each include a plurality of corresponding blades 104' and 106'. A radial-bearing assembly 310 is disposed about shaft 102. Radial bearing assembly 310 may include an outer radial bearing member (e.g., a stator or outer race 312, and an inner radial bearing member (e.g., a rotor or inner race 314). For example, the outer race 312 may be coupled to bearing housing 126 via bonding (e.g., brazing or soldering), press-fitting, a mechanically connection (e.g., one or more fasteners, by key way, threaded attachment, or combinations thereof), or other suitable technique, and the inner race 314 may be coupled to shaft 102 by any of the same coupling techniques. While shown disposed at approximately a center point between compressor wheel 104 and turbine wheel 106, in other embodiments, it will be understood that radial-bearing assembly 310 may be disposed adjacent to turbine wheel 106, adjacent to compressor wheel 104, or anywhere therebetween, as desired.

Figure 9:
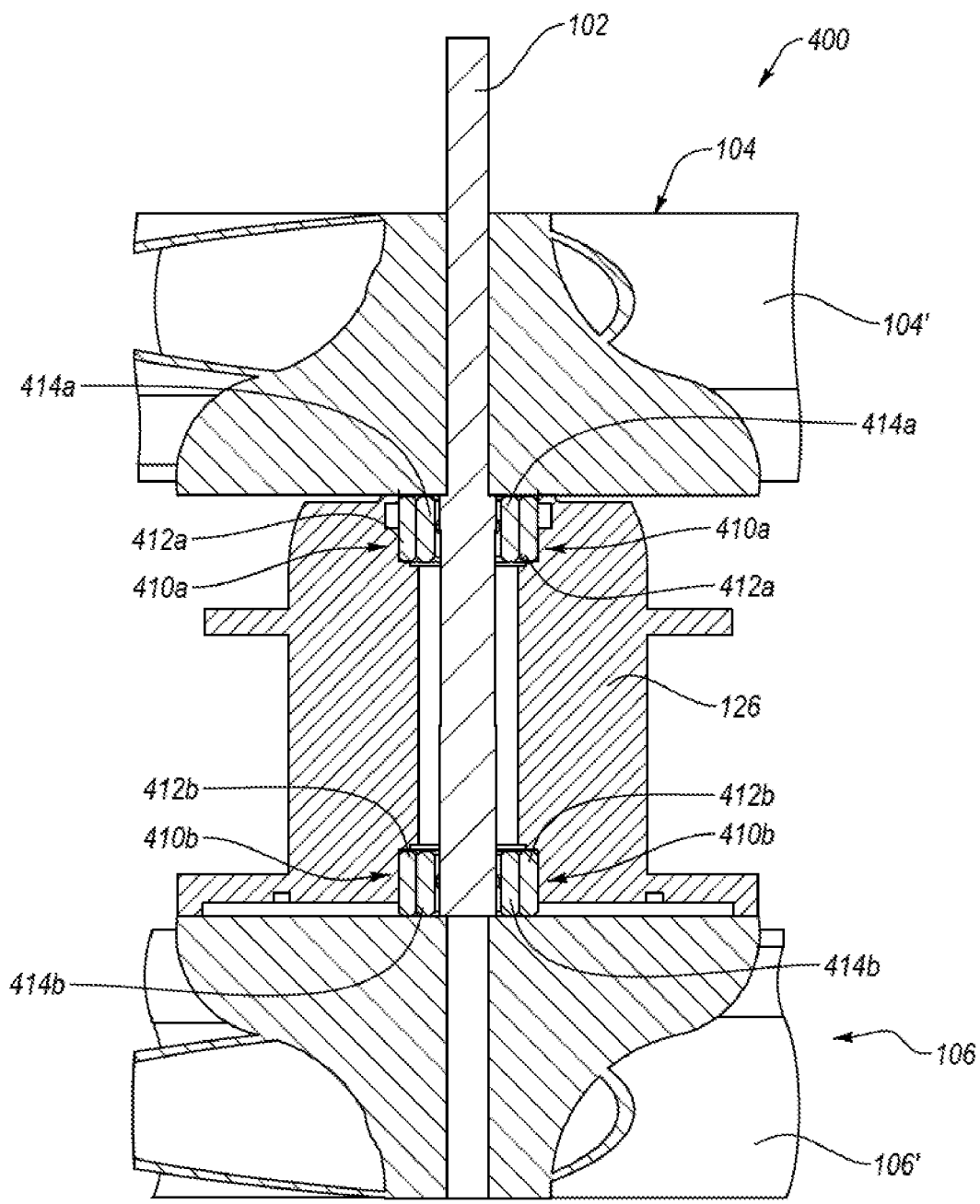
FIG. 9 is a cross-sectional view of another embodiment of a turbine assembly including combination thrust/radial bearing members.

FIG. 9 shows another turbine assembly 400 including a rotatable shaft 102, a compressor wheel 104, and a turbine wheel 106. Compressor wheel 104 and turbine wheel 106 may each include a plurality of corresponding blades 104' and 106'. First and second radial-bearing assemblies 410a and 410b are disposed about shaft 102, with first radial bearing assembly disposed adjacent to compressor wheel 104, and second radial bearing assembly disposed adjacent to turbine wheel 106. First and second radial bearing assemblies 410a and 410b may each include an outer radial bearing member (e.g., a stator or outer race 412a and 412b, respectively) coupled to bearing housing 126, and an inner radial bearing member (e.g., a rotor or inner race 414a and 414b, respectively) coupled to shaft 102. While shown with one radial bearing assembly disposed to adjacent compressor wheel 104 and the other disposed adjacent to turbine wheel 106, in other embodiments, it will be understood that radial-bearing assemblies 410a and 410b may be disposed (e.g., one or more of them away from wheels 104, 106, towards a center region between wheels 104 and 106), as desired.

Figure 10:
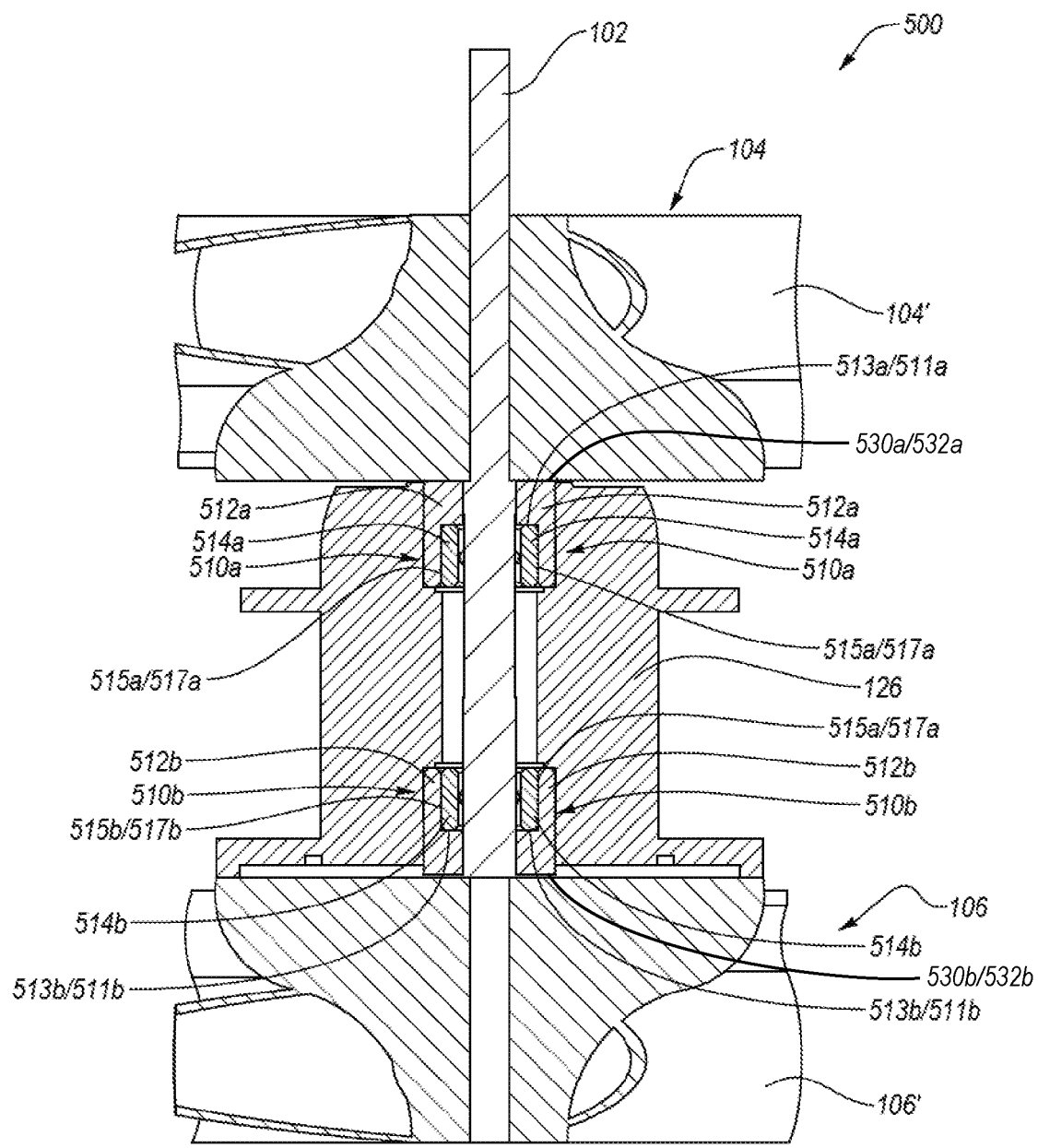
FIG. 10 is a cross-sectional view of another embodiment of a turbine assembly including two sets of radial bearing members.

FIG. 10 shows another turbine assembly 500 including a rotatable shaft 102, a compressor wheel 104, and a turbine wheel 106. Compressor wheel 104 and turbine wheel 106 may each include a plurality of corresponding blades 104' and 106'. First and second combination thrust/radial-bearing assemblies 510a and 510b are disposed about shaft 102, with first combination bearing assembly 510a disposed adjacent to compressor wheel 104, and second combination bearing assembly 510b disposed adjacent to turbine wheel 106. Each combination bearing assembly 510a and 510b may include an inner combination bearing member (e.g., a rotor 514a and 514b, respectively) coupled to shaft 102 and an outer combination bearing member (e.g., a stator 512a and 512b, respectively) that may be coupled to bearing housing 126. Each inner bearing member 514a, 514b may include a radial bearing surface (i.e., 515a, 515b) and a first thrust-bearing rotor surface (i.e., 513a, 513b), which radial surfaces 515a, 515b and first thrust-bearing rotor surfaces 513a, 513b are oriented substantially perpendicular relative to one another. Similarly, each outer bearing member 512a, 512b may include a radial bearing surface (i.e., 517a, 517b) and a first thrust-bearing stator surface (i.e., 511a, 511b). Radial bearing surfaces 517a, 517b are oriented to be generally opposed to corresponding radial bearing surfaces 515a, 515b, while first thrust-bearing stator surfaces 511a, 511b are oriented to be opposed to corresponding first thrust-bearing rotor surfaces 513a, 513b. Further, as shown in FIG. 10, at least one of the stators 512a, 512b may include an additional thrust-bearing surface (i.e., 530a, 530b) that bears against an opposing surface (i.e., 532a, 532b) of at least one of the compressor wheel 104 or the turbine wheel 106.

Figure 11:
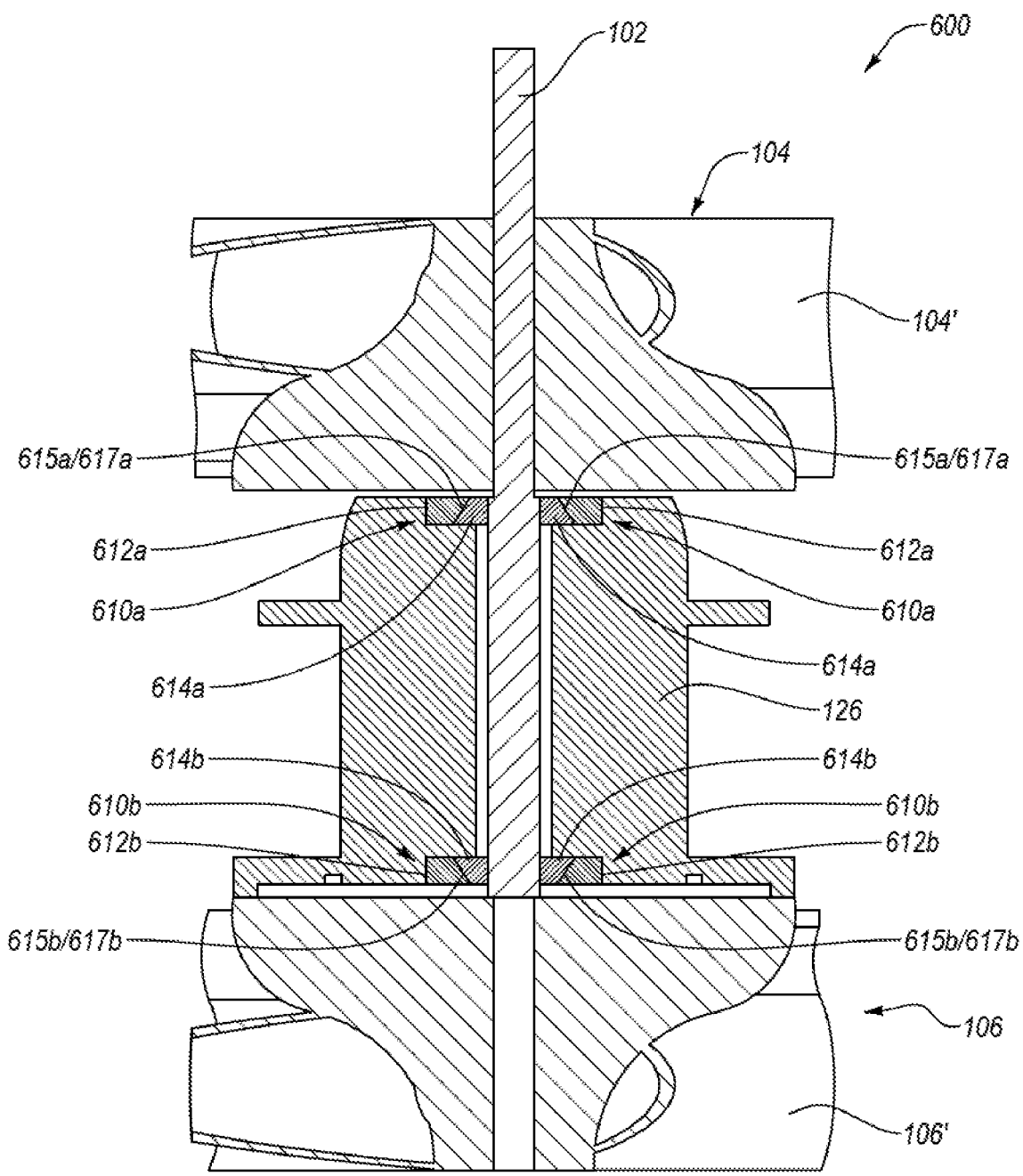
FIG. 11 is a cross-sectional view of another embodiment of a turbine assembly including combination thrust/radial bearing members.

FIG. 11 shows another turbine assembly 600 including a rotatable shaft 102, a compressor wheel 104, and a turbine wheel 106. Compressor wheel 104 and turbine wheel 106 may each include a plurality of corresponding blades 104' and 106'. First and second combination thrust/radial-bearing assemblies 610a and 610b are disposed about shaft 102, with first combination bearing assembly 610a disposed adjacent to compressor wheel 104, and second combination bearing assembly 610b disposed to adjacent turbine wheel 106. Each combination bearing assembly 610a and 610b may include an inner combination bearing member (e.g., a rotor 614a and 614b, respectively) disposed about and coupled to shaft 102 and an outer combination bearing member (e.g., a stator 612a and 612b, respectively) that may be coupled to bearing housing 126. Each inner bearing member 614a, 614b may include an angled (e.g., from about 30° to about 60°, or about 45°) combination radial and thrust-bearing surface (i.e., 615a, 615b). Each outer bearing member 612a, 612b may include a correspondingly angled combination radial and thrust-bearing surface (i.e., 617a, 617b). Combination bearing surfaces 617a, 617b are oriented to be generally opposed to corresponding combination bearing surfaces 615a, 615b.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

The invention claimed is:

1. A turbine assembly, comprising:
   a rotatable shaft;
   at least one of a compressor wheel or a turbine wheel coupled to the shaft;
   a surface disposed about and coupled to the rotatable shaft, the surface extending from the rotatable shaft;
   a thrust-bearing rotor disposed about and coupled to the rotatable shaft, the thrust-bearing rotor spaced from the surface, the thrust-bearing rotor including a thrust-bearing rotor surface extending from the rotatable shaft; and
   a thrust-bearing stator including a first thrust-bearing stator surface and a second thrust-bearing stator surface, the first thrust-bearing stator surface oriented to bear against the surface in a thrust-bearing configuration, the second thrust-bearing stator surface oriented to generally face the thrust-bearing rotor surface.

2. A forced induction high speed engine comprising the turbine assembly of claim 1.

3. The forced induction high speed engine of claim 2, wherein the forced induction high speed engine includes an internal combustion engine.

4. At least one of a turbocharger, a jet engine, a pump, a compressor, or a steam turbine comprising the turbine assembly of claim 1.

5. The forced induction high speed engine of claim 2, wherein the forced induction high speed engine includes at least one of a blower, a compressor, or a pump.

6. An assembly comprising:
a rotatable shaft;
a first thrust-bearing member disposed about the shaft, the first thrust-bearing member including a first thrust-bearing superhard bearing surface;
a first radial bearing member disposed about the shaft and adjacent to the first thrust-bearing member, the first radial bearing member including:
a first radial bearing stator including a first radial stator superhard bearing surface;
a first radial bearing rotor coupled to the shaft, the first radial bearing rotor including a first radial rotor superhard bearing surface oriented generally opposed to the first radial stator superhard bearing surface of the first radial bearing stator;
wherein at least one of the first radial bearing stator or the first radial bearing rotor further includes a first radial thrust-bearing surface oriented generally opposed to the first thrust-bearing superhard bearing surface of the first thrust-bearing member;
a second radial bearing member disposed about the shaft;
wherein at least one of the first radial bearing member or the second radial bearing member includes sintered polycrystalline diamond, wherein the sintered polycrystalline diamond defines a superhard bearing surface.

7. The assembly of claim 6 wherein the sintered polycrystalline diamond includes a plurality of interstitial regions at least partially occupied by at least one catalyst.

8. The assembly of claim 6, further comprising a second thrust-bearing member disposed adjacent to the second radial bearing member.

9. The assembly of claim 8, wherein the second radial bearing member includes:
a second radial bearing stator including a second radial stator superhard bearing surface and a second thrust-bearing surface oriented generally opposed to the second thrust-bearing surface of the second thrust-bearing member;
a second radial bearing rotor coupled to the shaft, the second radial bearing rotor including a second radial rotor superhard radial bearing surface oriented generally opposed to the second radial superhard bearing surface of the second radial bearing stator.

10. The assembly of claim 9 wherein each of the first radial bearing stator, the second radial bearing stator, the first radial bearing rotor, and the second radial bearing rotor includes a generally cylindrical sintered polycrystalline diamond body with a longitudinal hole formed therethrough.

11. The assembly of claim 8 wherein each of the first thrust-bearing member and second thrust-bearing member is generally shaped as a hollow cylinder.

12. The assembly of claim 11 wherein each of the first thrust-bearing member and the second thrust-bearing member includes a generally cylindrical polycrystalline diamond body with a longitudinal hole formed therethrough that receives the rotatable shaft.

13. The turbine assembly of claim 6 wherein at least one of the first thrust-bearing member, the first radial bearing stator, the first radial bearing rotor, or the second radial bearing member includes one or more lubricant supply channels formed generally transverse therethrough.

14. The assembly of claim 6, further comprising a compressor wheel coupled to the shaft, wherein the first thrust-bearing member is disposed adjacent to the compressor wheel.

15. The assembly of claim 6, further comprising a turbine wheel coupled to the shaft, wherein the first thrust-bearing member is disposed adjacent to the turbine wheel.

16. At least one of a turbocharger, a jet engine, a pump, a compressor, or a steam turbine comprising the assembly of claim 6.

17. An assembly comprising:
a rotatable shaft;
a first thrust-bearing member and a second thrust-bearing member that are each disposed about the shaft, the first thrust-bearing member and the second thrust-bearing member spaced from each other, at least one of the first thrust-bearing member or the second thrust-bearing member including a sintered polycrystalline diamond body, each of the first thrust-bearing member and the second thrust-bearing member defining a superhard thrust-bearing surface; and
a first radial bearing member and a second radial bearing member that are each disposed about the shaft;
wherein the first radial bearing member is disposed adjacent to the first thrust-bearing member and includes a first radial thrust-bearing surface oriented to generally oppose the superhard thrust-bearing surface of the first thrust-bearing member;
wherein the second radial bearing member is disposed adjacent to the second thrust-bearing member and includes a second radial thrust-bearing surface oriented to generally oppose the superhard thrust-bearing surface of the second thrust-bearing member.

18. The assembly of claim 17, wherein the superhard thrust-bearing surface of at least one of the first thrust-bearing member or the second thrust-bearing member is generally planar.

19. The assembly of claim 17, wherein the sintered polycrystalline diamond body is generally cylindrical and defines a longitudinal hole therethrough that receives the rotatable shaft.

20. The assembly of claim 17, further comprising a compressor wheel coupled to the shaft, wherein the first thrust-bearing member is disposed adjacent to the compressor wheel.

21. The assembly of claim 17, further comprising a turbine wheel coupled to the shaft, wherein the first thrust-bearing member is disposed adjacent to the turbine wheel.

22. At least one of a turbocharger, a jet engine, a pump, a compressor, or a steam turbine comprising the assembly of claim 17.

* * * * *